United States Patent
Anderson

(10) Patent No.: US 6,674,584 B2
(45) Date of Patent: Jan. 6, 2004

(54) OPTICAL SURFACE-MOUNT LENS CELL

(75) Inventor: David Paul Anderson, Boulder, CO (US)

(73) Assignee: PTS Corporation, San Jose, CA (US)

( * ) Notice: Subject to any disclaimer, the term of this patent is extended or adjusted under 35 U.S.C. 154(b) by 63 days.

(21) Appl. No.: 09/899,013

(22) Filed: Jul. 3, 2001

(65) Prior Publication Data

US 2003/0189769 A1 Oct. 9, 2003

(51) Int. Cl.[7] ............ G02B 7/02; G03B 17/26; G03B 21/14; F21J 362/455

(52) U.S. Cl. ............ 359/819; 359/811; 396/526; 362/455; 353/100

(58) Field of Search .................... 359/819, 811, 359/820; 396/526; 362/455; 353/100

(56) References Cited

U.S. PATENT DOCUMENTS

| | | | | |
|---|---|---|---|---|
| 4,733,945 A | * | 3/1988 | Bacich | 359/820 |
| 5,117,311 A | * | 5/1992 | Nomura | 359/819 |
| 5,414,540 A | | 5/1995 | Patel et al. | 359/39 |
| 5,493,452 A | * | 2/1996 | Hoshino et al. | 359/811 |
| 5,757,559 A | * | 5/1998 | Nomura et al. | 359/819 |
| 5,768,649 A | * | 6/1998 | Pearson | 359/811 |
| 5,917,625 A | | 6/1999 | Ogusu et al. | 359/130 |
| 5,960,133 A | | 9/1999 | Tomlinson | 385/18 |
| 5,999,672 A | | 12/1999 | Hunter et al. | 385/37 |
| 6,052,232 A | * | 4/2000 | Iwaki | 359/819 |
| 6,097,519 A | | 8/2000 | Ford | 359/130 |
| 6,097,859 A | | 8/2000 | Solgaard et al. | 385/17 |
| 6,108,471 A | | 8/2000 | Zhang et al. | 385/37 |
| 6,307,657 B1 | | 10/2001 | Ford | |

OTHER PUBLICATIONS

Rallison, R.D., *Dense Wavelength Division Multiplexing (DWDM) and the Dickson Grating*, White Paper, Ralcon Dev. Lab., rdr@ralcon.com, Jan. 6, 2001, pp. 1–9.

U.S. patent application Ser. No. 09/442,061, Weverka et al., filed Nov. 16, 1999.

Joseph E. Ford et al., "Wavelength Add–Drop Switching Using Tilting Micromirrors," Journal of Lightwave Technology, vol. 17, No. 5, May 1999.

John D. Grade et al., "A Large–Deflection Electrostatic Actuator for Optical Switching Applications," Solid–State Sensor and Actuator Workshop, Hilton Head Island, SC, Jun. 4–8, 2000.

I. Nishi, et al., "Broad–Passband–Width Optical Filter for Mutli/Demultiplexer Using a Diffraction Grating and a Retroreflector Prism," Electronics Letters, vol. 21, No. 10, May 9, 1985.

P. Phillipe, et al., Wavelength demultiplexer: using echelette grating.

Z. J. Sun, "Demultiplexer with 120 Channels and 0.29–nm Channel Spacing," IEEE Photonics Technology Letters, vol. 10, No. 1, Jan. 1998.

Hopkins, "Some Thoughts on Lens Mounting," Optical Engineering, Sep.–Oct. 1976, vol. 15, No. 5.

* cited by examiner

Primary Examiner—Hung Xuan Dang
Assistant Examiner—Joseph Martinez
(74) Attorney, Agent, or Firm—Townsend and Townsend and Crew LLP

(57) ABSTRACT

An apparatus and method for housing an optical element are provided. A ring is configured with a symmetry that corresponds to that of the optical element and for bonding with the optical element on an optical surface at a periphery of the optical element. An axial retaining spring may be provided for securing the optical element within an optical-system assembly. The axial retaining spring includes axial constraint fingers to engage a subsequent optical component and structures adapted to apply a point load at selected locations on the optical element.

38 Claims, 9 Drawing Sheets

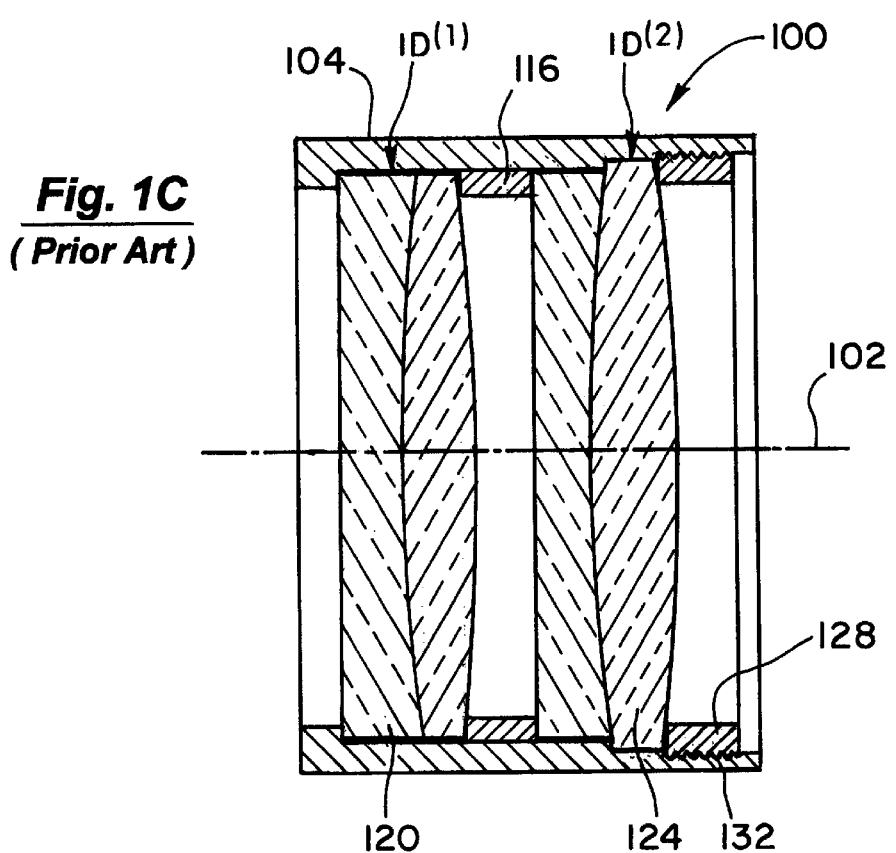
Fig. 1C *(Prior Art)*
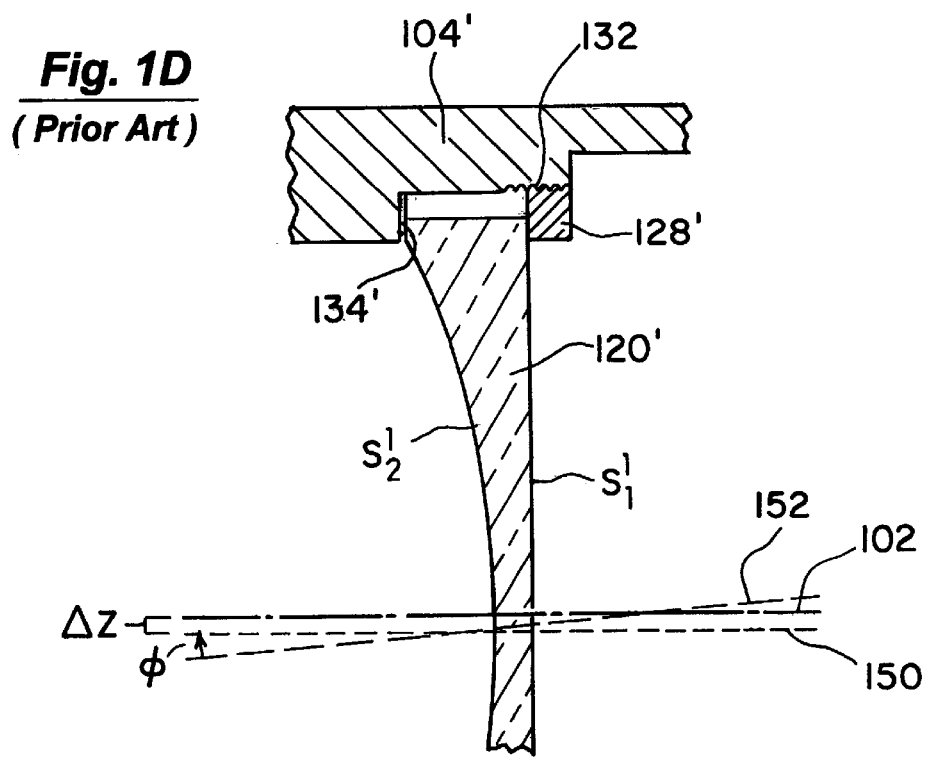
Fig. 1D *(Prior Art)*

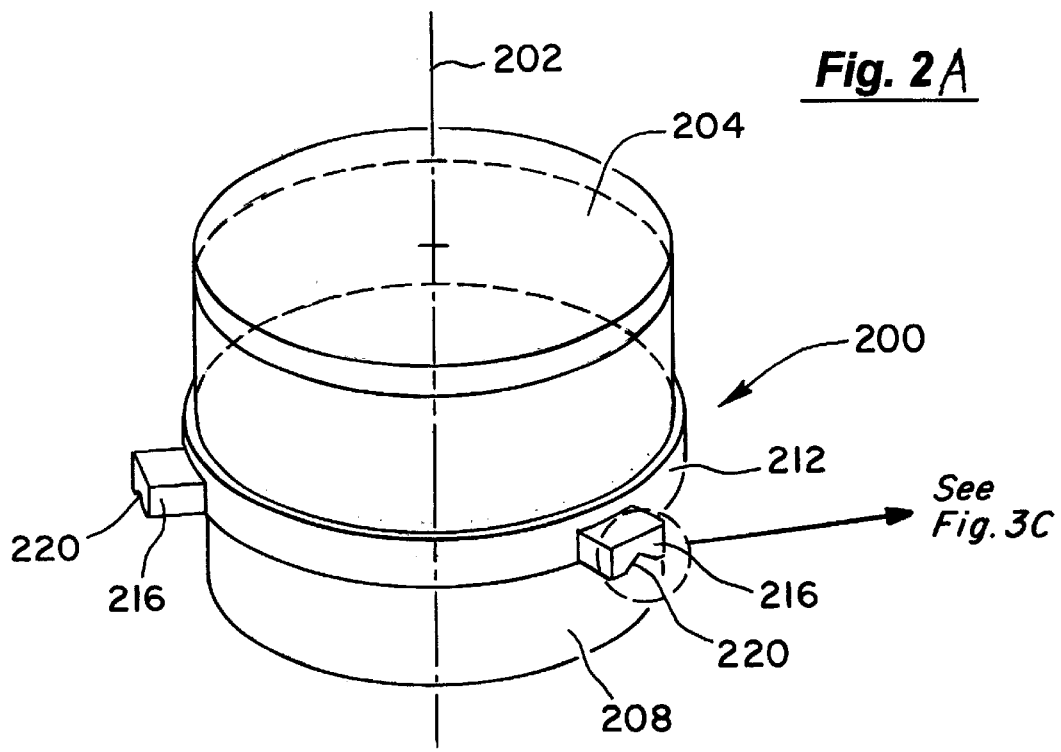
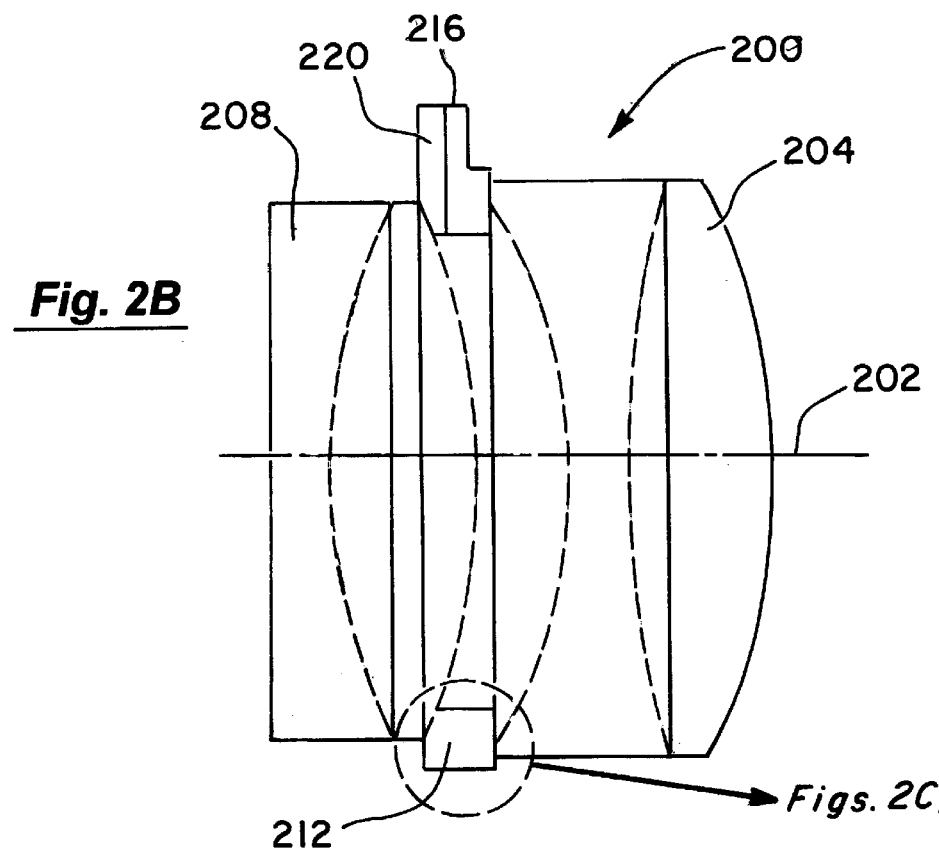

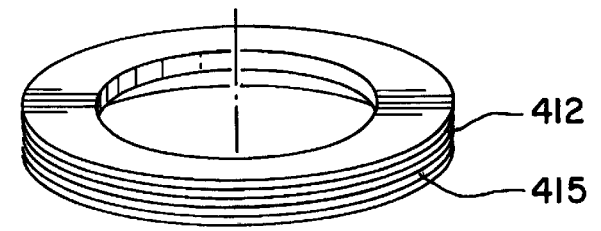
Fig. 4A
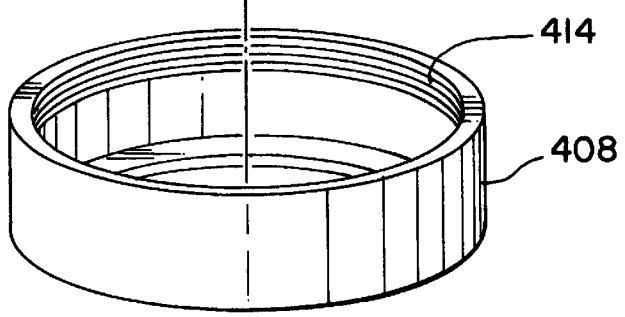
Fig. 4B
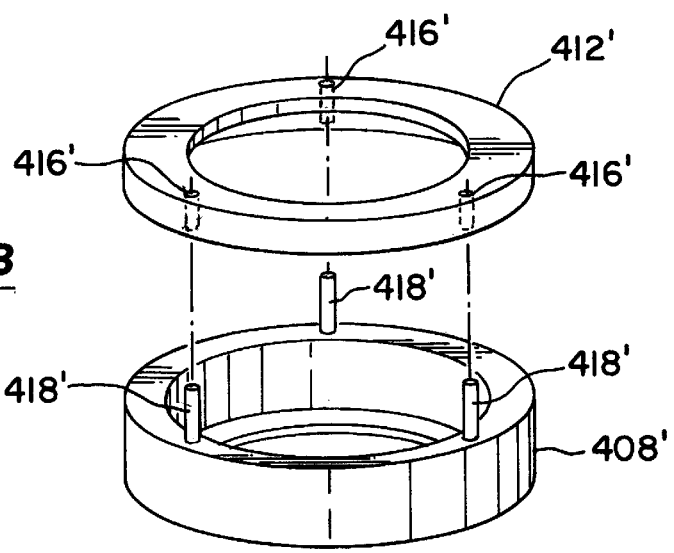
Fig. 4C
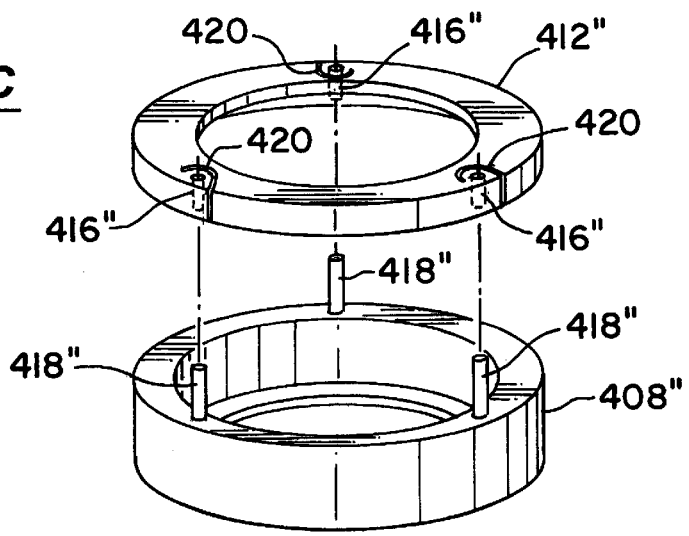

OPTICAL SURFACE-MOUNT LENS CELL

BACKGROUND OF THE INVENTION

This application relates generally to optical systems, and more particularly to techniques and devices for mounting optical devices.

In virtually any optomechanical engineering application, it is necessary for optical elements to be mounted within the system with accurate alignment. This is especially the case for a variety of high-performance optical systems, such as may be used in fiber-optic telecommunications applications, among others. In the design and manufacture of such systems, optical components are typically mounted with a lens cell, with the optical axis of such optical components being aligned with respect to an axis of the lens cell. The lens cell may then be used within an assembly having multiple components, the alignment of the optical elements within the assembly being achieved through alignment of the lens-cell axis.

Examples of such a prior-art lens cell are illustrated in FIGS. 1A–1F. FIG. 1A shows a perspective drawing of a prior-art lens cell 100 in which optical elements are positioned within the lens cell 100. FIGS. 1B and 1C respectively show a cutaway perspective drawing and a cross-sectional projection drawing of the same lens cell 100 in which other features of the lens cell 100 may be more apparent. An external cylindrically shaped body 104 is used to house the optical elements, which in FIGS. 1A–1C are shown as a pair of achromatic lens doublets 120 and 124 separated by a spacer 116. The spacer 116 forms part of the interior of the lens cell 100 and is used for configurations in which a separation is desired between individual lens elements. The optical elements 120 and 124 are configured such that they share a common optical axis that is coincident with the central axis 102 of the cylindrical external body 104.

The optical elements 120 and 124 are mounted within the lens cell 100 on their outside diameters, requiring machining of tight tolerances. The interior of the lens cell may be configured with different inside diameters at different points in order to accommodate differences in optical elements. For example, the lens cell illustrated in FIGS. 1A–1C is configured generally with an inside diameter ID($^1$) that is appropriate for housing the first lens doublet 120. It also includes a notched portion with a larger inside diameter ID($^2$) at that point where the second lens doublet is mounted. After machining the lens cell 100 with tight tolerances, the optical elements are typically mounted within by filling any small space around a given lens element with an elastomeric material such as a room-temperature vulcanizing elastomer. The optical elements are additionally secured with a threaded retainer clamp 128, which is secured within the lens cell 100 by threads 132 and perhaps also by staking. For the illustrated prior-art configuration, at least one end of the lens cell 100 is equipped with a shoulder 112 having a plurality of notches 108 that may assist in maintaining alignment of optical elements when the lens cell 100 is integrally connected with a subsequent component of the optical-system assembly.

FIGS. 1D, 1E, and 1F show cross-sectional details of different optical elements that may be mounted. In these figures, reference numerals correspond generally to those structures in FIGS. 1A–1C, but include primes to designate structures that may be configured differently to accommodate differences in the optical elements.

In FIG. 1D, for example, a plano-concave lens 120' having flat surfaces is shown. The external body 104' provides a holding structure for the lens 120' having surfaces $S_1'$ and $S_2'$ in a nominally aligned condition relative to the axis 102 of the lens cell. The flat surfaces of the lens 120' are configured in contact with seat 134' and the retainer clamp 128'. In FIG. 1E, an example of an optical element having only a single flat surface, in this instance a plano-convex lens 120" having surfaces $S_1"$ and $S_2"$, is shown. The lens 120" is mounted similarly to the external body 104", with the plano surface of the lens configured in contact with the seat 134", but a precision centering spacer 136" is additionally installed over the outer convex optical surface in contact with the retainer clamp 128". In FIG. 1F, a meniscus lens 120''' having surfaces $S_1'''$ and $S_2'''$ is shown. Although the lens 120''' has two curved surfaces, it includes a sag 156''' configured for contact with a precision centering spacer 136'''. The lens 120''' is mounted to the external body 104''' by including a conical or spherical surface 158''' used to center the lens 120''' to the cell and by including a retainer clamp 128'''.

Such prior-art lens-cell arrangements suffer from a number of disadvantages, including the need to satisfy tight tolerances to mount the optical elements on their outside diameters. Generally, the outside diameter of the lens must be controlled to the optical axis as well as the sag. The difficulty in achieving proper alignment is evident for all three of the mounting schemes shown in FIGS. 1D–1F. In general, the axis 152 of the lens 120 may be tilted with respect to the axis 102 of the lens cell 100 by an angle φ and may be offset longitudinally by a distance Δz; in the figures, axis 150 shows the lens axis 152 after being rotated to be parallel to the cell axis 102. Mounting of the lens 120 seeks to achieve (φ=Δz=0.

Thus, with the arrangement of FIG. 1D, the tilt φ of the lens axis 152 is established by the shoulder in contact with the seat 134' and by alignment of $S_1'$ and $S_2'$. Centration of lens 120' is established by the low-precision threaded retainer clamp 128'. The arrangement of FIG. 1E is somewhat better. The precision centering spacer 136" is match-machined for mating to the inside diameter of the lens 120". Centration of the lens 120" to the cell 100 is therefore established by the carefully machined conical surface of the spacer 136". The tilt is controlled the same fashion as in FIG. 1D. In the arrangement of FIG. 1F, in which the lens 120''' includes sag 156''', both the tilt and centration are controlled by the precision spacer 136'''.

For these prior-art designs to be effective, it is necessary to control a number of physical parameters to very great precision, including: (i) the inside diameter of the external body 104; (ii) the relative sizes of the outside and inside diameters of the external body 104; (iii) the position of the conical or spherical seat position relative to the external body 104; (iv) the outside diameter of the spacer 136 relative to the outside diameter of the external body 104; (v) the orientation of the spacer 136 relative to the outside external body 104; and (vi) the orientation of the lens sag 156 to the lens axis 152. A deficiency in any one of these parameters may result in a poorly oriented lens in the lens cell. Accordingly, it is desirable to have another lens-cell arrangement that avoids these disadvantages.

SUMMARY OF THE INVENTION

Thus, embodiments of the invention are directed to an apparatus and method for housing an optical element. In one embodiment, a first optical component is configured with a ring having a symmetry that corresponds to that of the optical element. The ring is configured for bonding with the optical element on an optical surface at a periphery of the optical element.

In certain embodiments, the invention is directed to an optical-system assembly that includes the first optical component engaged with a second optical component. The first optical element may include a means for demountably engaging the ring with another component of the optical-system assembly. The second optical component includes a base and a plurality of engagement members connected with the base for engagement with the ring.

In certain embodiments, the ring is further configured for bonding with a second optical element on an optical surface at a periphery of the second optical element. The ring may thus be configured to act as a spacer separating the two optical elements along a symmetry axis of the ring. The symmetry axis of the ring may be coincident with optical axes of each of the two optical elements. In some embodiments, at least one of the two optical elements comprises a lens doublet.

In certain embodiments, three notched structures are provided on an exterior side of the ring. Each notched structure may comprise a groove that extends radially from the ring. In some embodiments, the groove has a triangular cross section and in others has a cross section shaped as a gothic arch. The engagement members may comprise spheres that are configured to fit each such groove. The first and second optical components of the optical-system assembly may be secured with an axial retaining spring. The axial retaining spring includes a body that has a symmetry axis corresponding to a common symmetry of the first and second optical components. It also includes a plurality of axial constraint fingers extending from the body substantially parallel to the symmetry axis and configured to engage the second optical component. A plurality of structures on the body are adapted to apply a point load at selected locations on the first optical component.

In one embodiment, the optical-system assembly is incorporated in a wavelength router. The wavelength router receives light having a plurality of spectral bands at an input port and directs subsets of the spectral bands to output ports. A free-space optical train disposed between the input port and the output ports provides optical paths for routing the spectral bands. The optical train includes the first and second optical components, with the first optical component including a lens element and the second optical component including a dispersive element. The router also includes a routing mechanism that has at least one dynamically configurable routing element. A given spectral band may be directed to different output ports depending on a state of the dynamically configurable routing element.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components, and in other instances primes are used to denote similar components of different configurations. When reference is made to a reference numeral without specification to an existing sublabel or without primes, it is intended to refer to all such multiple similar components.

FIG. 1C is a cross-sectional projection drawing of a prior-art lens cell;

FIGS. 1D, 1E, and 1F are projection drawings illustrating the different prior-art mountings of various types of lenses in a prior-art lens cell;

FIG. 2A is a perspective drawing of one embodiment of an optical surface-mount lens cell according to the invention;

FIG. 2B is a projection drawing of one embodiment of an optical surface-mount lens cell according to the invention;

FIGS. 4A, 4B, and 4C illustrate various alternative schemes for mounting the optical-system assembly.

DESCRIPTION OF THE SPECIFIC EMBODIMENTS

1. Optical Surface-Mount Lens Cell

Figure 1A:
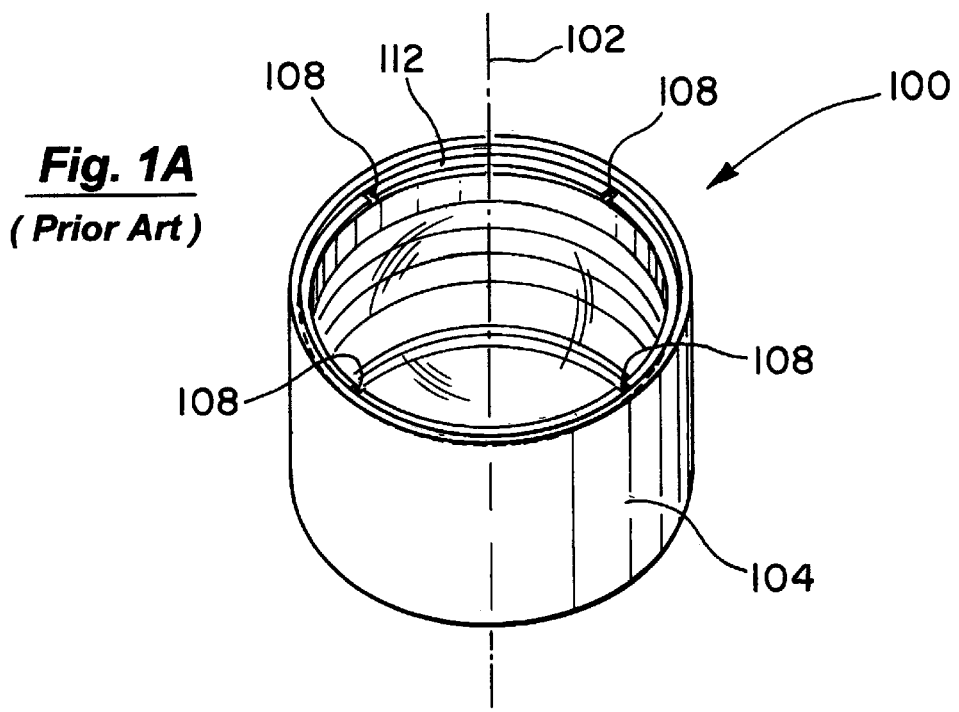
FIG. 1A is a perspective drawing of a prior-art lens cell.
Figure 1B:
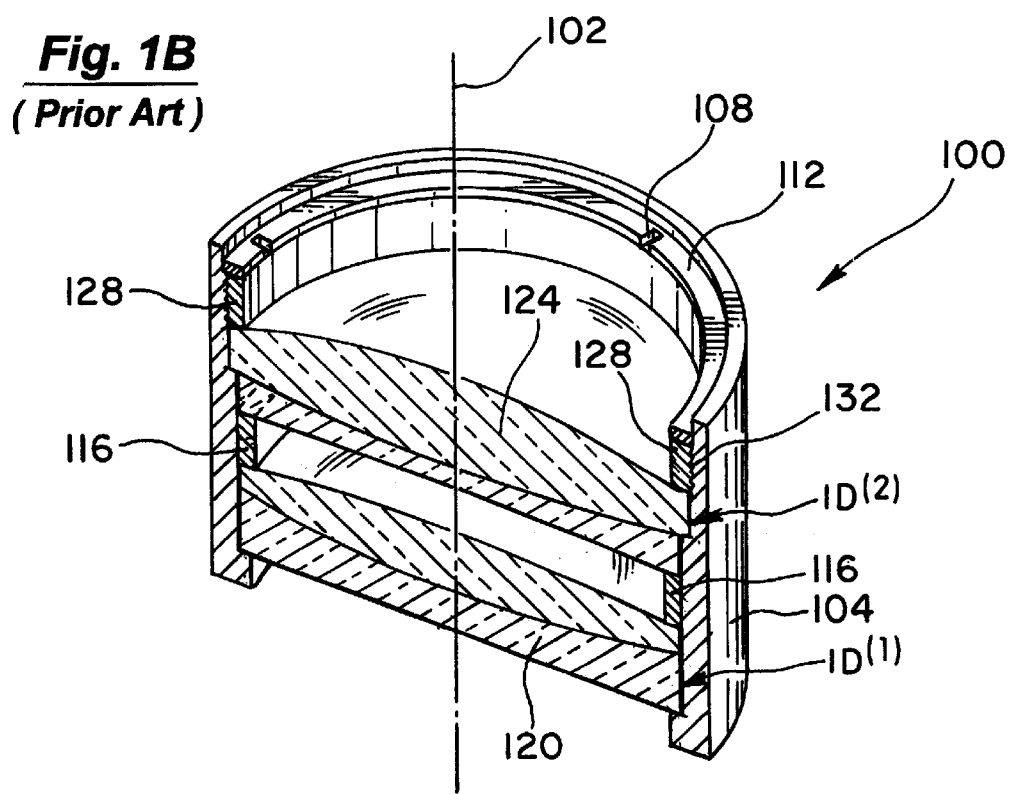
FIG. 1B is a cutaway perspective drawing of a prior-art lens cell.
Figure 1E:
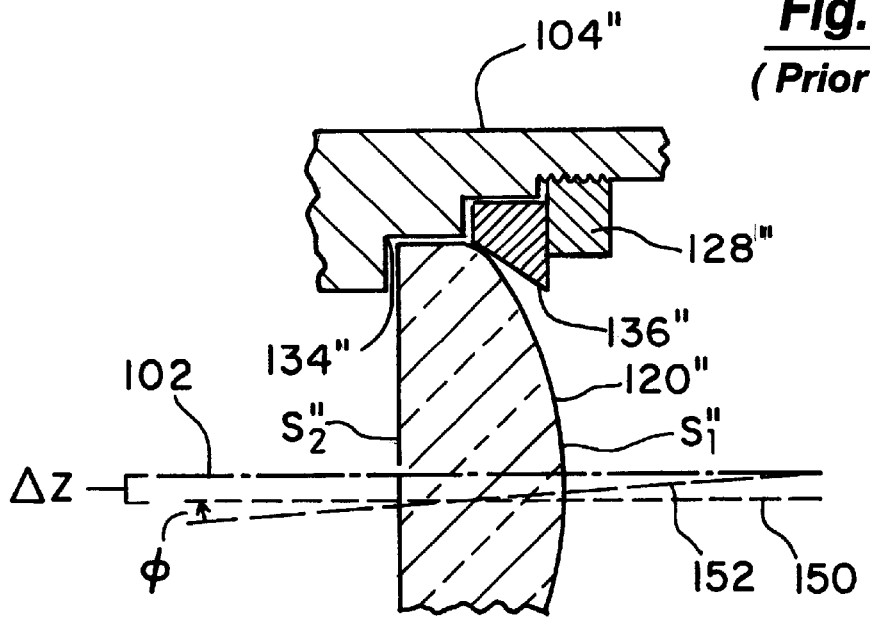
Figure 1F:
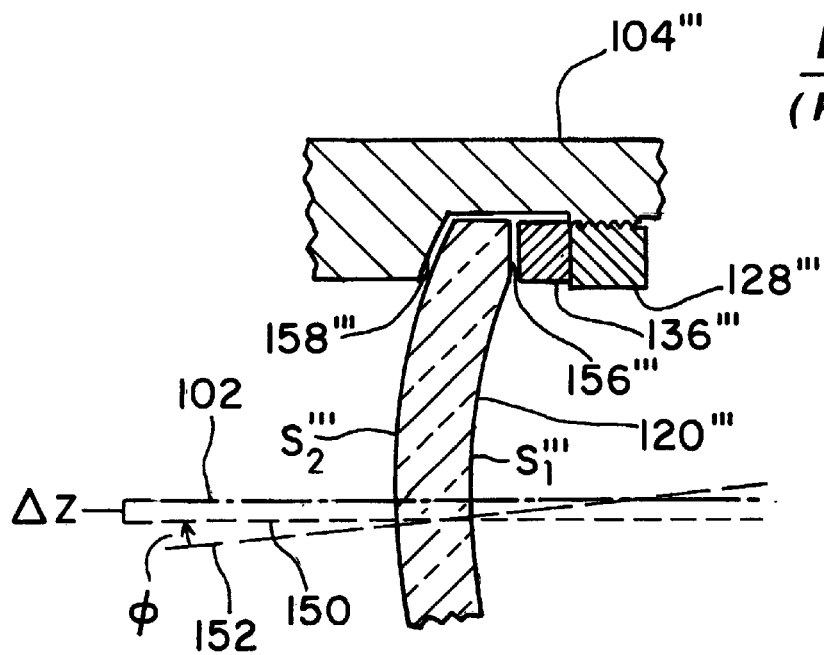
Figure 2C:
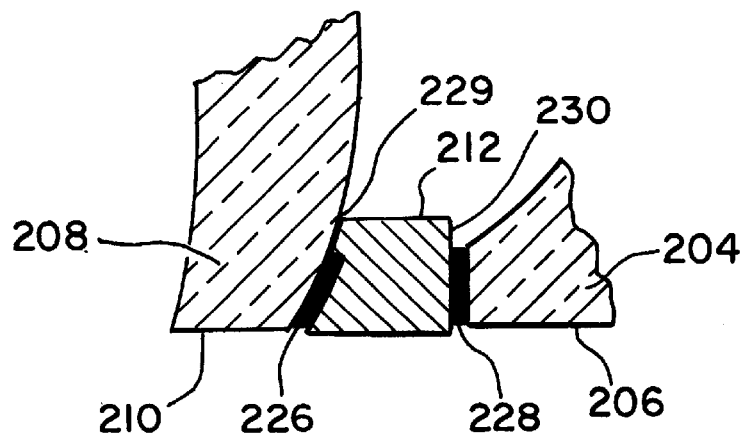
FIGS. 2C and 2D show expanded views of a portion of FIG. 2B illustrating different mounting methods for the optical surface-mount lens cell with the lenses.

The basic structure of an optical surface-mount lens cell according to one embodiment of the invention is shown in FIGS. 2A–2C. In FIG. 2A, this embodiment is illustrated with a perspective drawing while FIGS. 2B and 2C show a corresponding projection drawing. In the illustrated embodiment, an arrangement, denoted generally as 200, is depicted in which two separated lens doublets are aligned with a common optical axis 202. As will be apparent from the following description, the invention is not limited to such an arrangement and may be used for other optical configurations. As shown in the illustrated embodiment, the first lens doublet 204 may have a different outside diameter than the second lens doublet 208.

Each of the lens doublets 204 and 208 is attached with a lens-cell body 212 that is configured as a ring having a symmetry corresponding to that of the lens doublets. Thus, in FIGS. 2A–2C, the lens-cell body 212 is shown to be circularly symmetric, sharing a symmetry axis that is coincident with the shared optical axis 202. The lens-cell body 212 acts not only to hold the optical elements in alignment, but also acts as a spacer between optical elements in embodiments, such as the one illustrated, in which the optical elements are separated.

Figure 2D:
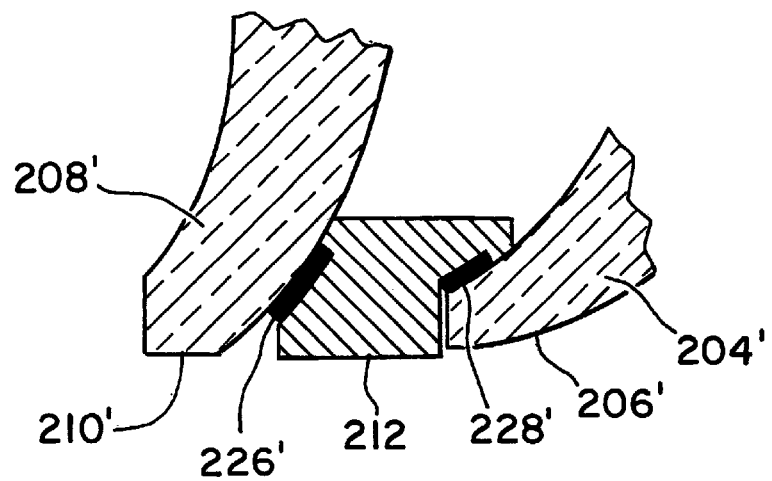

The mounting of the two lens doublets 204 and 208 to the lens-cell body 212 is shown in FIG. 2B. The details shown in FIGS. 2C and 2D provide exemplary mounting schemes that may be used for bonding to the optical surfaces of the lenses or to the sag. For example, in FIG. 2C, lens doublet 204 is mounted to the lens-cell body with bond 228 on the sag of one of its component lenses while lens doublet 208 is mounted with bond 226 to the lens-cell body on its optical surface. In FIG. 2D, each of the two lens doublets 204' and 208' is mounted directly to the lens-cell body on their precision optical surfaces with bonds 226' and 228'. This differs particularly from the prior-art arrangements shown in FIGS. 1A–1F in which the outside diameter (corresponding to surfaces 206 and 210 in FIG. 2C and to surfaces 206' and 210') was bonded. Such bonds may be readily configured for both plano and curved surfaces. One advantage of this bonding arrangement is that there is no requirement that the diameters of the optical elements be precision ground to accommodate the assembly of the lens cell.

FIGS. 2A and 2B also illustrate the inclusion of structures 216 configured to provide a kinematic interface when the optical arrangement 200 is provided as one component of an optical-system assembly. Each of the structures 216 includes a notch 220 configured so that the kinematic interface may be demountably engaged with an engagement element of the other optical-system component with great repeatability. In the illustrated embodiment, the notch 220 comprises a groove that extends radially outwards from the lens-cell ring 212 and has a triangular cross section. In alternative embodiments, the cross section may be differently shaped, such as in the form of a gothic arch. This permits demountable engagement with a spherically shaped engagement element described in greater detail with respect to FIG. 3C below.

In one embodiment, as illustrated in FIG. 2A, three such notched structures 216 are provided around the lens-cell body 212 at equal angular spacings of 120°. In other embodiments, a different number of notched structures 216 may be used and may be configured at unequal angular spacings. The use of three such notched structures defines a plane orthogonal to the axis of the lens-cell body 212. The optical elements bonded to the lens-cell body 212 are preferably configured such that their optical axes 202 are coincident with the lens-cell-body axis thus defined.

In certain embodiments, the individual optical elements may themselves comprise a plurality of optical subelements. For example, achromatic lens doublets are commonly used in applications where it is desired to cancel chromatic aberrations that result from individual lenses having spherical surfaces with a homogeneous index of refraction. Such chromatic aberrations may be canceled with lens doublets that consist of two lenses, each having a different index of refraction. Various techniques will be known to those of skill in the art for fabricating such lens doublets. For example, in one technique, different types of homogeneous glass are ground into the proper shape and then polished and cemented together. In another technique, two different types of homogeneous glass with different indices of refraction are bonded together by heat and the interface slumped into a prescribed shape. These and other techniques may be used more generally to form segmented lenses with more than two subelements, such segmented lenses also capable of being used with the present invention.

Various methods are also known to those of skill in the art for ensuring that the resulting lens doublet (or higher-order segmented lens) has a single optical axis by orienting the optical axes of the subelements coincidentally. For example, one method includes defining the optical axis for each subelement by rotating the subelement such as on an air spindle. When a light beam, such as a laser beam, is propagated through the rotating subelement, reflections from the two surfaces of the subelement can be aligned so that the optical axis of the subelement is coincident with the axis of rotation. This may be done with each of the subelements to establish a common optical axis before they are bonded to form the lens doublet (or higher-order segmented lens).

Similar alignment techniques may also be used with the lens cell of the present invention to align the optical axes of the optical elements with the lens-cell axis, which is defined as passing through the center of a conical surface 229 on the lens-cell body 212 and perpendicular to a planar surface 230 of the lens-cell body. Thus, for example, the lens-cell body 212 may be rotated on a spindle to define a preferred optical axis that is also orthogonal to the plane 230 and passes through the center of the conical surface 229, and thereby substantially coincident with the axis of rotation of the lens-cell body 212. One of the optical elements, for example a first lens doublet 204, is then also positioned and rotated with the spindle. Reflections of a light beam, such as a laser beam, from the surfaces of that optical element are then used to align the optical element so that its optical axis is coincident with the axis of rotation, and thereby also with the axis of the lens-cell body 212. This may be repeated for additional optical elements, such as a second lens doublet 204, which is thereby also aligned with the lens-cell-body axis by aligning reflections from its surfaces. In one alternative technique, carefully machined parts are used to align the optical axes of the different optical elements geometrically.

Figure 3A:
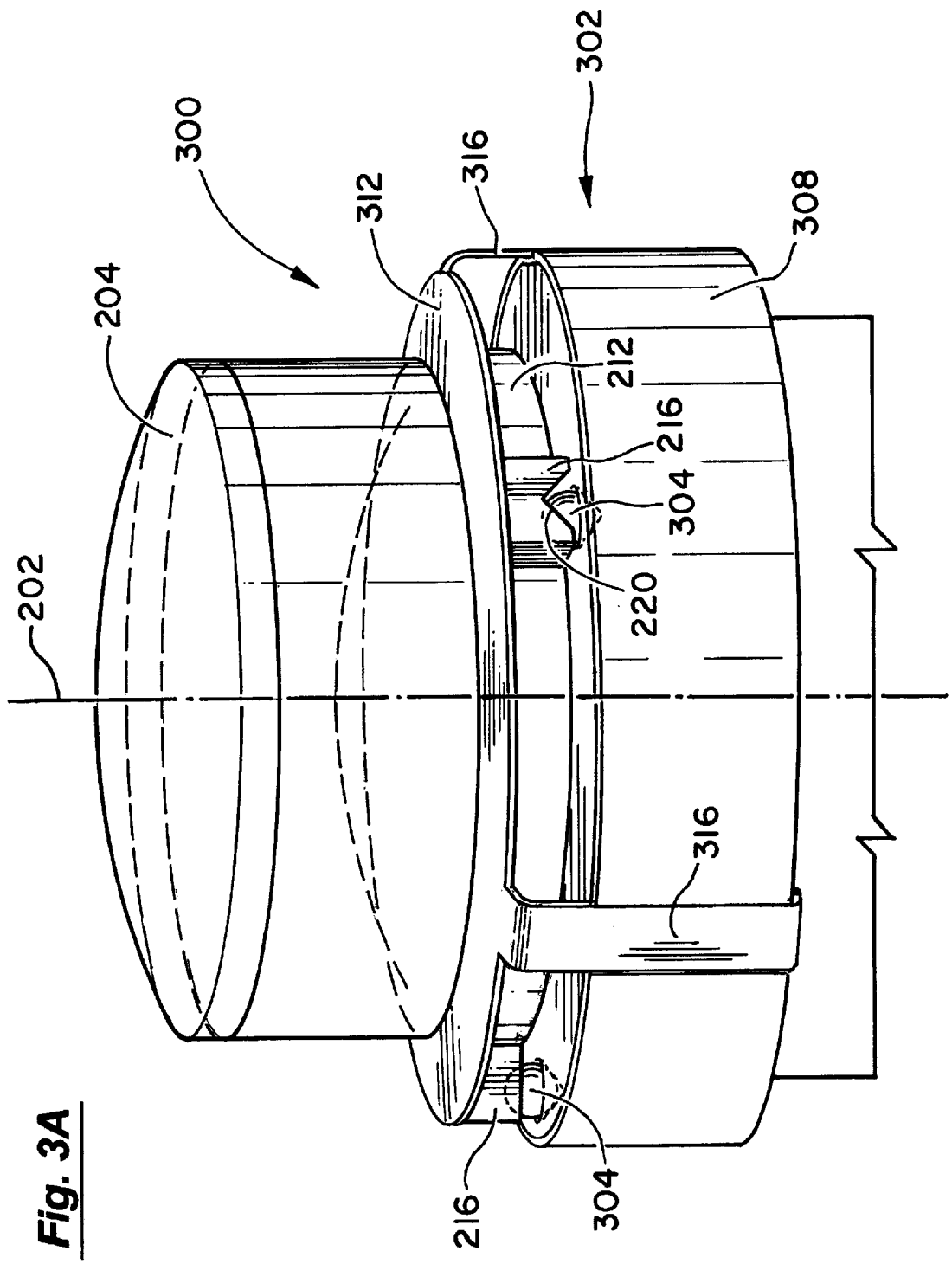
FIG. 3A is a perspective drawing of an optical-system assembly including one embodiment of an optical surface-mount lens cell and a subsequent component.

The optical arrangement 200 may be attached with a subsequent component 302 to form an optical-system assembly 300 such as illustrated in FIG. 3A. The subsequent component comprises a base 308 and a plurality of engagement elements 304 configured on the base 308 to match the notched structures 216 of the lens cell for demountable engagement. The base may house other optical elements to be used within the optical-system assembly 300. In the embodiment illustrated in FIG. 3A, the engagement elements 304 are configured spherically to fit within the triangular notches 220 of the notched structures 216. The engagement interface thus formed is an exactly constrained kinematic interface and properly matches six degrees of freedom, three linear and three rotational. Moreover, the resulting configuration is radially correct. For example, one advantage of such a configuration over the prior-art lens cells described with respect to FIGS. 1A–1F is that it not only provides an optical-system assembly 300 that is radially correct, but does so in a manner that is largely insensitive to thermal expansion of the materials used at the kinematic interface. Such thermal expansion is a particular concern for the prior-art lens cell when it encounters temperature gradients since the optical elements are housed in its interior in a fashion especially sensitive to the lens cell's radial dimensions.

Figure 3B:
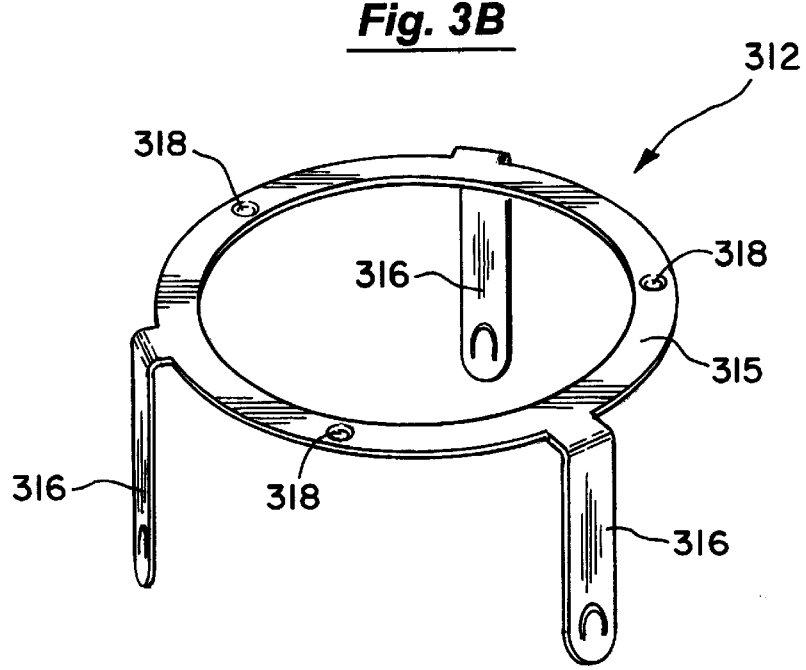
FIG. 3B is a perspective drawing of an axial retainer spring used with the optical surface-mount lens cell.
Figure 3C:
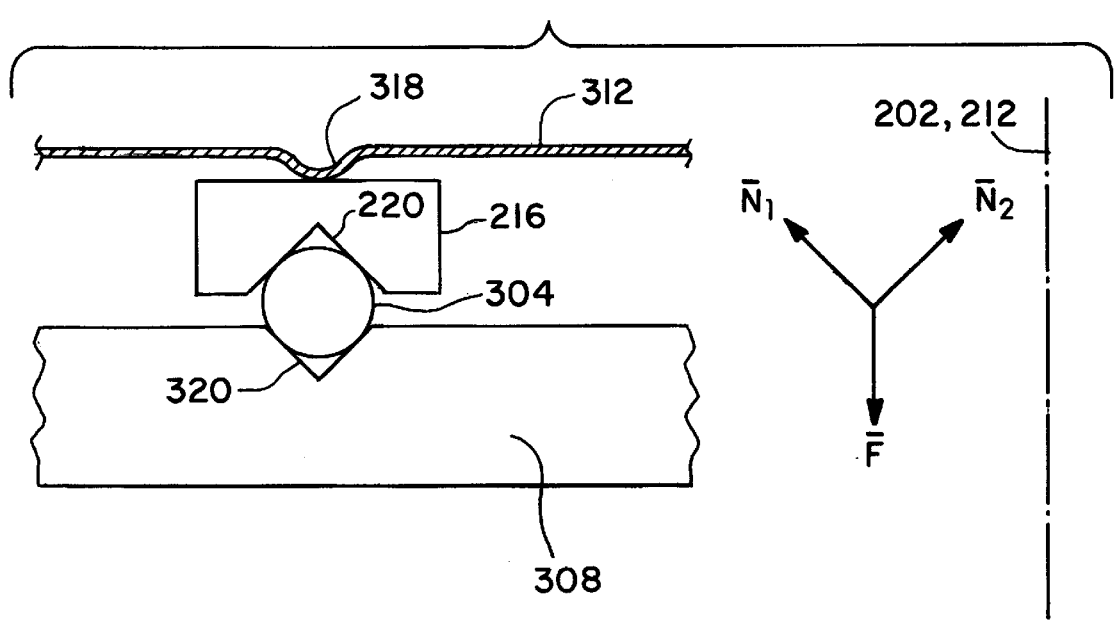
FIG. 3C is a projection drawing illustrating the force balance achieved with the axial retainer spring.

Various methods may be used to fasten the optical arrangement 200 with the subsequent component 302 so that the optical-system assembly 300 is secure. One such method is illustrated in FIGS. 3A–3C using a nesting force that is provided by a spring retainer 312. With such a mounting method, the spring retainer 312 is positioned over the top surfaces of the notched structures 216. The axial spring retainer 312 includes a body 315 that has a symmetry axis corresponding to a common symmetry of the optical arrangement 200 and the base 308. A plurality of axial constraint fingers 316 are snapped around the base 308 to position the axial spring retainer 312. The spring retainer 312 thus provides force to maintain the kinematic interface. In one embodiment, the number of axial constraint fingers 316 is equal to the number of engagement members 304, the axial constraint fingers 316 being equally spaced between the engagement members 304.

The axial spring retainer 312 is shown in perspective view in FIG. 3B. In addition to the plurality of axial constraint fingers 316 configured to engage the base 308, a plurality of dimples 318 are included. In one embodiment, the dimples are formed as spherical surfaces deflected out of the plane of the spring body 315. The function of the dimples 318 is shown in FIG. 3C, the left portion of which shows a cross-sectional view of the lens cell body 212 with the base 308. The right portion of the figure shows a force diagram illustrating the forces in the system when the lens cell body 212 and base 308 are engaged with the axial spring retainer 312. The base 308 includes a nesting recess 320 for housing the spherical engagement element 304, with the surfaces of the base 308 providing nesting forces $\vec{N}_1$ and $\vec{N}_2$. The design of the axial spring retainer 312 is such that the nesting forces pass directly through the center of the engagement member 304 along an axis parallel to the coincident lens cell body axis 212 and optical axis 202. Each of the dimples 318 applies a point load $\vec{F}$ directly over the engagement member 304 to cancel the resultant of the nesting forces and thereby provide a stable static configuration.

Once secured, the optical-system assembly 300 is resistant even to substantial mechanical shocks or vibrations that may upset the alignment of the optical elements. Accordingly, the assembly shown in FIG. 3 was subjected to vibration tests. The assembly was vibrated at frequencies between 10 and 2000 Hz along each of three orthogonal axes, one axis parallel to the optical axis 202 and two axes lying in the plane orthogonal to the optical axis 202. The driving vibration amplitude was 20g. In one test, each axis was vibrated separately in a sequence of 10-2000-10-2000-10 Hz. At each of the five points in this sequence, the axis was vibrated for approximately six minutes. For the vibration axis parallel to the optical axis 202, a resonant mode was found at approximately 1100 Hz, with a quality factor Q of 1.15 (corresponding to an amplitude of 23g). For the axis orthogonal to the optical axis 202, a resonant mode was found at approximately 2800 Hz, with a quality factor Q of 2.0 (corresponding to an amplitude of 40g).

Various alternative and equivalent schemes for securing the optical-system assembly may be adopted within the spirit and scope of the invention. Some alternative schemes are shown schematically in FIGS. 4A–4C, although other alternatives will be apparent to those of skill in the art. For example, FIG. 4A shows a perspective drawing of a thread arrangement that may be used to secure a lens cell body 412 with a base 408. The lens cell body 412 includes outside-diameter threads 415 configured for engagement with interior threads 414 in the base. In FIG. 4B a scheme is adopted that uses fastener holes 416' within the lens cell body 412'. The base 408' includes fasteners 418' configured for engagement with the fastener holes 416'. A further variation is illustrated in FIG. 4C where the lens cell 412" includes integral flexures 420 in addition to the fastener holes 416". The fasteners 418" of the base 408" are secured by the integral flexures 420 when engaged to reduce mounting distortion.

Various advantages of embodiments of the invention over the prior-art configuration of FIGS. 1A–1F are evident. Not only is the number of parts reduced, thereby also reducing assembly complexity, but access to the optical elements for manipulation is greatly enhanced. In addition, both complexity and cost are reduced by mounting the optical elements on their optical surfaces instead of on their outside diameters, reducing the need for precision-grounded diameters. Additionally, unrecoverable optical alignment errors due to machining tolerances of the lens cell are reduced substantially to zero for the configuration shown in FIG. 2C and to an axial alignment error (i.e. axial offset only) for the configuration shown in FIG. 2D.

2. Wavelength Router

An optical surface-mount lens cell such as described above may be used in a wide variety of optical assemblies. An example of one such assembly is a wavelength router, such as the one described in detail in the copending, commonly assigned United States Patent Application, filed Nov. 16, 1999 and assigned Ser. No. 09/442,061, entitled "Wavelength Router," which is herein incorporated by reference in its entirety, including the Appendix, for all purposes. The following describes the structure of some embodiments of such a wavelength router, although the invention may be readily used with other wavelength-router embodiments also.

Fiber optic telecommunications systems are currently deploying a relatively new technology called dense wavelength division multiplexing (DWDM) to expand the capacity of new and existing optical fiber systems to help satisfy the steadily increasing global demand for bandwidth. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are performed with a wavelength router used with the current invention by an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

Wavelength routing functions may be performed optically with a free-space optical train disposed between the input ports and the output ports, and a routing mechanism. The free-space optical train can include air-spaced elements or can be of generally monolithic construction. The optical train includes a dispersive element such as a diffraction grating, and is configured so that the light from the input port encounters the dispersive element twice before reaching any of the output ports. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by their first encounter with the dispersive element.

Figure 5A:
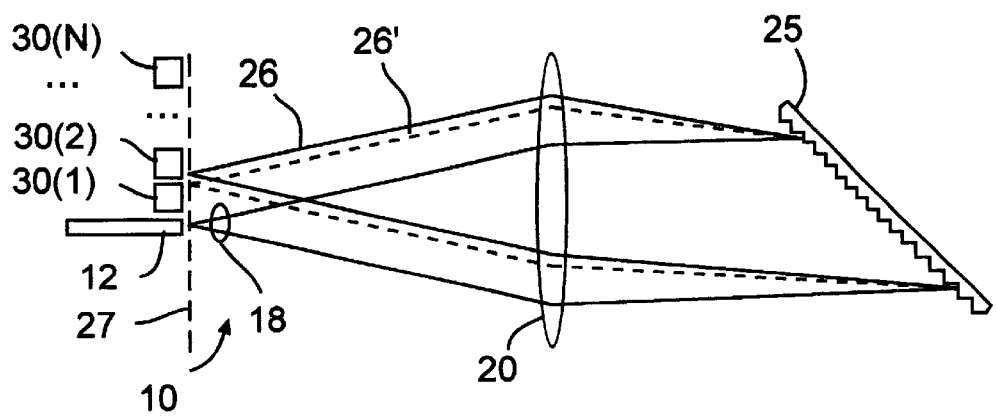
FIGS. 5A, 5B, and 5C are schematic top, side, and end views, respectively, of one embodiment of a wavelength router that uses spherical focusing elements.
Figure 5B:
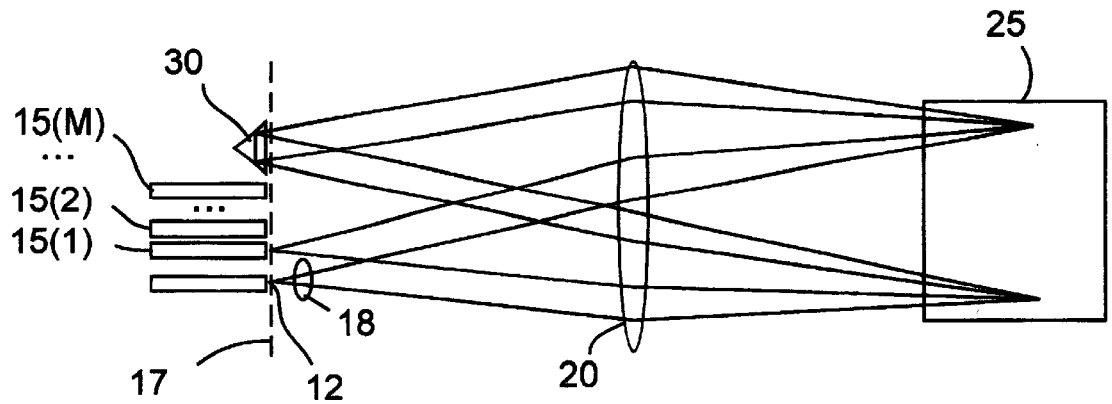
Figure 5C:
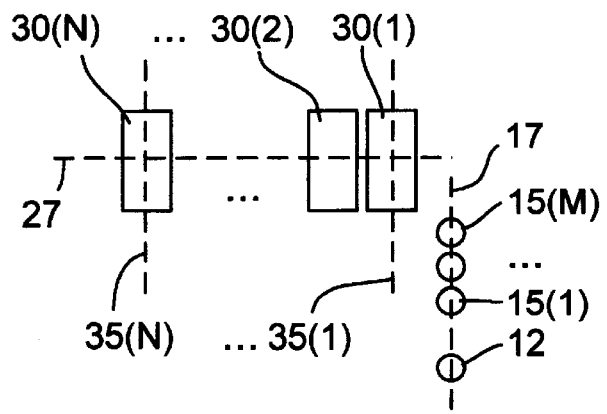

FIGS. 5A, 5B, and 5C are schematic top, side, and end views, respectively, of one embodiment of a wavelength router 10. Its general functionality is to accept light having a plurality N of spectral bands at an input port 12, and to direct subsets of the spectral bands to desired ones of a plurality M of output ports, designated 15(1) . . . 15(M). The output ports are shown in the end view of FIG. 5C as disposed along a line 17 that extends generally perpendicular to the top view of FIG. 5A. Light entering the wavelength router 10 from input port 12 forms a diverging beam 18, which includes the different spectral bands. Beam 18 encounters a lens 20 that collimates the light and directs it to a reflective diffraction grating 25. The grating 25 disperses the light so that collimated beams at different wavelengths are directed at different angles back towards the lens 20. In accordance with the invention, the lens 20 is mounted with a lens-cell ring arrangement of the type described above. The grating 25 is housed within a base that is secured with the lens-cell ring as also described above. Proper alignment between the lens 20 and grating 25 is thereby maintained.

Two beams are shown explicitly and denoted 26 and 26', the latter drawn in dashed lines. Since these collimated beams encounter the lens 20 at different angles, they are focused towards different points along a line 27 in a transverse plane extending in the plane of the top view of FIG. 5A. The focused beams encounter respective ones of a plurality of retroreflectors, designated 30(1) . . . 30(N), located near the transverse plane. The beams are directed back, as diverging beams, to the lens 20 where they are collimated, and directed again to the grating 25. On the second encounter with the grating 25, the angular separation between the different beams is removed and they are directed back to the lens 20, which focuses them. The retroreflectors 30 may be configured to send their intercepted beams along a reverse path displaced along respective lines 35(1) . . . 35(N) that extend generally parallel to line 17 in the plane of the side view of FIG. 5B and the end view of FIG. 5C, thereby directing each beam to one or another of output ports 15.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A cell for housing an optical element that forms part of an optical-system assembly, the cell comprising:
    a ring having a symmetry corresponding to that of the optical element and configured for bonding with the optical element on an optical surface at a periphery of the optical element, the ring further being configured for bonding to a second optical element at an optical surface at a periphery of the second optical element.

2. The cell recited in claim 1 further comprising means for demountably engaging the ring with another component of the optical-system assembly.

3. The cell recited in claim 1 wherein the ring is configured to act as a spacer separating the optical element from the second optical element along a symmetry axis of the ring.

4. The cell recited in claim 1 wherein the ring is circular.

5. The cell recited in claim 1 further comprising a plurality of notched structures connected with a side of the ring, each such notched structure being configured for demountable engagement with a subsequent component of the optical-system assembly.

6. The cell recited in claim 5 wherein the plurality of notched structures is connected with an exterior side of the ring.

7. The cell recited in claim 6 wherein each such notched structure comprises a groove that extends radially from the ring and is configured for demountable engagement with an engagement element comprised by the subsequent component.

8. The cell recited in claim 7 wherein the groove has a triangular cross section.

9. The cell recited in claim 7 wherein the groove has a cross section shaped as a gothic arch.

10. The cell recited in claim 1 wherein the ring includes a conical surface that defines an axis of the ring.

11. A method for housing an optical element that forms part of an optical-system assembly, the method comprising:
    aligning an optical axis of the optical element to be coincident with a symmetry axis of a ring;
    bonding an optical surface of the optical element with the ring at a periphery of the optical element;
    aligning an optical axis of a second optical element to be coincident with the symmetry axis of the ring; and
    bonding an optical surface of the second optical element with the ring at a periphery of the second optical element.

12. The method recited in claim 11 wherein the optical element and the second optical element are bonded with the ring such that the ring acts as a spacer separating the optical element from the second optical element along the symmetry axis of the ring.

13. The method recited in claim 11 further comprising forming a kinematic interface between the ring and a subsequent component of the optical-system assembly.

14. The method recited in claim 13 wherein an exterior side of the ring comprises a plurality of notched structures.

15. The method recited in claim 14 further comprising demountably engaging a groove that extends radially from the ring within each such notched structure with an engagement element comprised by the subsequent component.

16. The method recited in claim 11 wherein the ring includes a conical surface that defines the symmetry axis of the ring, and wherein aligning the optical axis of the optical element to be coincident with the symmetry axis of the ring comprises rotating the ring about the symmetry axis.

17. An axial retaining spring for securing a first optical component to a second optical component, the axial retaining spring comprising:
    a body having a symmetry axis corresponding to a common symmetry of the first and second optical components;
    a plurality of axial constraint fingers extending from the body substantially parallel to the symmetry axis and configured to engage the second optical component; and
    a plurality of structures on the body adapted to apply a point load at selected locations on the first optical component.

18. The axial retaining spring recited in claim 17 wherein the structures on the body are provided in equal number as the axial constraint fingers and are positioned intermediate between pairs of axial constraint fingers.

19. The axial retaining spring recited in claim 17 wherein the structures on the body comprise spherical-surface dimples formed in the body.

20. An optical-system assembly comprising:
    a first optical component including:
        a first optical element;
        a second optical element; and
        a ring having a symmetry corresponding to that of the first optical element, wherein the ring is bonded with the first optical element on an optical surface at a periphery of the first optical element and bonded with the second optical element on an optical surface at a periphery of the second optical element; and a second optical component including:
a base;
an additional optical element housed by the base; and
a plurality of engagement members connected with the base and configured for engagement with the ring of the first optical component.

21. The optical-system assembly recited in claim 20 wherein the first and second optical components share a common optical axis and are separated by the ring along the common optical axis.

22. The optical-system assembly recited in claim 21 wherein at least one of the first and second optical elements comprises a lens doublet.

23. The optical-system assembly recited in claim 20 wherein the first optical component further comprises a plurality of equally spaced notched structures connected with an exterior side of the ring, each such notched structure comprising a groove that extends radially from the ring for engagement with one of the plurality of engagement members.

24. The optical-system assembly recited in claim 23 wherein the groove has a triangular cross section.

25. The optical-system assembly recited in claim 23 wherein each such engagement member comprises a sphere.

26. The optical-system assembly recited in claim 20 further comprising an axial retaining spring having a plurality of axial constraint fingers configured to secure the first optical component with the second optical component.

27. The optical-system assembly recited in claim 20 wherein the first optical element comprises a lens.

28. The optical-system assembly recited in claim 20 wherein the plurality of engagement members comprise threads adapted to engage threads formed on the ring of the first optical component.

29. The optical-system assembly recited in claim 20 wherein the plurality of engagement members comprise fasteners adapted to engage fastener holes formed within the ring of the first optical component.

30. The optical-system assembly recited in claim 29 wherein the first optical component further includes integral flexures adapted to secure the fasteners when engaged with the fastener holes.

31. A method for fabricating an optical-system assembly, the method comprising:
aligning an optical axis of a first optical element to be coincident with a symmetry axis of a ring;
bonding an optical surface of the optical element with the ring at a periphery of the optical element;
aligning an optical axis of a second optical element to be coincident with the symmetry axis of the ring;
bonding an optical surface of the second optical element with the ring at a periphery of the second optical element; and
securing the ring to a base.

32. The method recited in claim 31 wherein the first and second optical components are separated by the ring along the symmetry axis of the ring.

33. The method recited in claim 31 wherein securing the ring to the base comprises engaging a plurality of notched structures connected with an exterior side of the ring to a plurality of engagement members connected with the base, wherein each of the notched structures comprises a groove that extends radially from the ring.

34. The method recited in claim 33 wherein the groove has a triangular cross section.

35. The method recited in claim 33 wherein each such engagement member comprises a sphere configured to fit the groove.

36. An optical-system assembly comprising:
first optical means having a first optical axis;
second optical means having a second optical axis:
support means having a symmetry axis, wherein the support means is bonded on an optical surface of the first optical means such that the first optical axis is coincident with the symmetry axis and bonded on an optical surface of the second optical means such that the second optical axis is coincident with the symmetry axis;
interface means connected with the support means; and
engagement means comprised by an optical component, the engagement means being engaged with the interface means.

37. The optical-system assembly recited in claim 36 wherein the first and second optical means are separated by the support means along the symmetry axis.

38. The optical-system assembly recited in claim 36 further comprising securing means for securing the support means with the optical component.

* * * * *